United States Patent
Richter et al.

(10) Patent No.: US 10,926,498 B2
(45) Date of Patent: Feb. 23, 2021

(54) METHOD FOR PRODUCING A RING GEAR FOR A PLANETARY GEAR TRAIN, AND A MODULAR SYSTEM HAVING SUCH A RING GEAR

(71) Applicant: Bühler Motor GmbH, Nuremberg (DE)

(72) Inventors: Olaf Richter, Stein (DE); Daniel Kirchgessner, Rimpar (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 31 days.

(21) Appl. No.: 16/273,641

(22) Filed: Feb. 12, 2019

(65) Prior Publication Data

US 2019/0176418 A1  Jun. 13, 2019

Related U.S. Application Data

(63) Continuation of application No. PCT/DE2017/200071, filed on Jul. 24, 2017.

(30) Foreign Application Priority Data

Aug. 12, 2016 (DE) ...................... 10 2016 115 043.6

(51) Int. Cl.
  *B29D 15/00*  (2006.01)
  *B29C 48/09*  (2019.01)
  (Continued)

(52) U.S. Cl.
  CPC .............. *B29D 15/00* (2013.01); *B29C 48/09* (2019.02); *B29C 48/12* (2019.02); *F16H 55/17* (2013.01); *B29C 2793/009* (2013.01); *B29C 2793/0027* (2013.01); *B29L 2015/00* (2013.01); *B29L 2015/003* (2013.01); *F16H 2055/176* (2013.01)

(58) Field of Classification Search
  CPC ......... B29D 15/00; B29C 48/09; B29C 48/12; B29C 2793/0027; B29C 2793/009; F16H 55/17; F16H 2055/176; B29L 2015/00; B29L 2015/003
  See application file for complete search history.

(56) References Cited

U.S. PATENT DOCUMENTS 3,412,632 A    11/1968  McFiggans
3,596,538 A *  8/1971   Braun ....................... F16H 1/46
                                                                475/342

(Continued)

FOREIGN PATENT DOCUMENTS

CA      2 646 077 A1    5/2009
WO      2015/185399 A1  12/2015

OTHER PUBLICATIONS

International Search Report dated Nov. 10, 2017, issued in counterpart International Application No. PCT/DE2017/200071 (6 pages).

(Continued)

*Primary Examiner* — Bayan Salone
(74) *Attorney, Agent, or Firm* — Westerman, Hattori, Daniels & Adrian, LLP

(57) ABSTRACT

A method for producing a ring gear for a planetary gear train, wherein a continuous profile is produced by an extrusion process and the continuous profile is subsequently cut to a predetermined cutting length in order to form a ring gear body.

6 Claims, 3 Drawing Sheets

(51) Int. Cl.
    *B29C 48/12*     (2019.01)
    *F16H 55/17*     (2006.01)
    *B29L 15/00*     (2006.01)

(56)                 References Cited

U.S. PATENT DOCUMENTS

| | | |
|---|---|---|
| 3,847,056 A | 11/1974 | Roger |
| 4,337,672 A | 7/1982 | Shiber |
| 5,551,270 A | 9/1996 | Bajraszewski et al. |
| 5,732,586 A | 3/1998 | Muessig et al. |
| 5,922,413 A * | 7/1999 | Takeda .................. B05D 7/54 |
| | | 427/104 |
| 5,927,129 A * | 7/1999 | Thoms .................. B29C 44/22 |
| | | 72/268 |
| 2005/0046290 A1* | 3/2005 | Baukholt .............. H02K 7/116 |
| | | 310/75 R |
| 2012/0302888 A1* | 11/2012 | Dai ..................... A61B 8/4444 |
| | | 600/447 |
| 2014/0183002 A1* | 7/2014 | Tully .................. B65G 13/071 |
| | | 198/600 |

OTHER PUBLICATIONS

Written Opinion of the International Searching Authority (Form PCT/ISA/237) dated Nov. 10, 2017, issued in counterpart International Application No. PCT/DE2017/200071 (8 pages).

\* cited by examiner

METHOD FOR PRODUCING A RING GEAR FOR A PLANETARY GEAR TRAIN, AND A MODULAR SYSTEM HAVING SUCH A RING GEAR

CROSS-REFERENCE TO RELATED APPLICATIONS

The present patent application is a continuation of International Application No. PCT/DE2017/200071, filed Jul. 24, 2017, which is based on, and claims priority from, German Application No. DE 10 2016 115 043.6, filed Aug. 12, 2016, both of which are incorporated herein by reference in their entireties.

BACKGROUND OF THE INVENTION

(1) Field of the Invention

The invention relates to a method for producing a ring gear for a planetary gear train, to a ring gear, and to a modular system having such a ring gear.

(2) Description of Related Art Including Information Disclosed Under 37 CFR 1.97 and 1.98

Planetary gear trains are generally known and are preferably used in many fields of application due to their small volume as well as the high torques achieved therewith. In a planetary gear train, the teeth of a plurality of planet gears engage from outside in the teeth of a sun gear mounted on a shaft. The teeth of the planet gears also engage in the teeth of a ring gear rotating about the planet gears. The ring gear thus forms the outer boundary of the planetary gear train.

The production of such ring gears has hitherto mainly been implemented via an injection molding process in small batches. A disadvantage of the production using the injection molding process is the high costs, in particular for the production of the injection molds. For each specification of a ring gear, thus for example different number of stages or torque capacity, a new injection mold must be produced. However, this increases not only the costs but also the production time of a ring gear.

The high costs are particularly disadvantageous if small lots of planetary gear trains are to be produced. These small lots cannot be produced at low cost with the previous production methods.

BRIEF SUMMARY OF THE INVENTION

It is an object of the present invention to specify a method for producing a ring gear for a planetary gear train, which method allows for a simple production of a ring gear and reduces the production costs, and with which ring gears with modified specifications can also be produced in the short term.

Furthermore, it is an object of the present invention to specify a ring gear for a planetary gear train which can be simply adapted to individual customer specifications. Moreover, it is an object of the present invention to specify a modular system with planet gears and different ring gears.

This object is achieved by a method for producing a ring gear for a planetary gear train, wherein a continuous profile is produced by an extrusion process and the continuous profile is subsequently cut to a predetermined cutting length in order to form a ring gear body.

Thus, the above-described method uses an extrusion process to produce a ring gear. In an extrusion process, a continuous profile is continuously pressed out of a shaping opening, what is known as a die, under pressure. The ring gear body thereby produced is cut to a predetermined cutting length in accordance with the method described above. The method described above thus allows the simple production of any lengths of ring gear bodies. In addition, a plurality of ring gear bodies can be produced in quick succession using the above-described method.

In one embodiment, an internal toothing may be formed on the continuous profile via the extrusion process. It is thus possible for the internal toothing to be formed directly via the extrusion process. This eliminates further processing steps, such that the produced ring gear is ready for use immediately. Furthermore, with the described embodiment of the method it is possible to replace the die for the extrusion process in order to produce a further configuration of the ring gear. For example, the number of teeth of the ring gear, which ultimately co-determines the gear ratio of the planetary gear train, may be adapted.

In one embodiment, the continuous profile may be cut without burrs. When cutting the ring gear body to a predetermined cutting length, it is advantageous if the cutting is carried out without burrs. This eliminates further post-processing steps which may need to be carried out manually. In a particularly advantageous embodiment, the cutting can comprise a laser cutting on the rotating end profile. Laser cutting allows cost-effective production even with a small minimum quantity.

In one embodiment, the continuous profile can be cut several times, wherein different cutting lengths can be set. It is thus possible to produce a plurality of different ring gears from one continuous profile. Each ring gear can differ in its cutting length. Various stages of a gear train can thus be produced from a single continuous profile.

In one embodiment, an end plate may be provided and be mounted on the ring gear body. An end plate represents an individually customizable customer interface. It is therefore advantageous if the end plate is produced separately from the ring gear body. For example, if a plurality of ring gear bodies of different cutting length are produced from a single continuous profile, each individual ring gear may be provided with different end plates for different customers. Thus, an even more cost-efficient production can be achieved.

The end plate may be joined to the ring gear body in order to mount the end plate on the ring gear. Joining may be performed, for example, by hot embossing, adhesive bonding, radial screwing, laser transmission welding, or by welding processes (IR welding, heat element welding, and friction welding). As a result of using joining methods that are ready for series production, high quality and cost-effective production of the ring gear can be ensured.

The object forming the basis of the invention is also achieved via the use of an extrusion process for producing a ring gear for a planetary gear train. Similar or identical advantages result as already described for the method described above.

In one embodiment, the ring gear body and/or the end plate can be produced from a plastic. Plastic is an inexpensive material that can be deformed well under heat and has proven to be advantageous, particularly given low performance requirements. In particular thermoplastics, such as polybutylene terephthalate (PBT) (reinforced or unreinforced), polyoxymethylene (POM), polyamides (PA), polyether sulfone (PES), or polyether ketones (PEEK) (reinforced or unreinforced), are preferably used plastics.

A further aspect of the invention relates to a ring gear for a planetary gear train, with an extruded, internally toothed ring gear body and an end plate, wherein the end plate is mounted on the ring gear body.

In one embodiment, the end plate may be joined to the ring gear body. In a further embodiment, the ring gear body and/or the end plate can consist of a plastic.

Similar or identical advantages result as were already described with the above-described method or the use of an extrusion process for producing a ring gear.

The ring gear preferably forms a housing with the end plate. If the ring gear body forms a housing with the end plate, a particularly compact design is possible. As a result of the round, homogeneous outer contour in connection with the face-side mounting of the end plate, no further housing is required, and installation space is thereby saved with respect to the diameter.

In a preferred embodiment, at least the ring gear body may be produced according to one of the methods described above.

The object forming the basis of the invention is further achieved by a modular system having planet gears and different ring gears which can be combined to form planetary gear trains with different stages, wherein the ring gears are each designed according to one of the ring gears described above and/or are produced by a method as described above. Particularly when a complete modular system having planet gears and different ring gears is provided, the advantages described above are particularly advantageous. It is thus possible to produce the different stages of a modular system from a single continuous profile. This significantly reduces the production time.

BRIEF DESCRIPTION OF THE SEVERAL VIEWS OF THE DRAWINGS

The invention is described below using a plurality of exemplary embodiments which are explained in more detail with reference to Figures. They show.

DETAILED DESCRIPTION OF THE INVENTION

Figure 1:
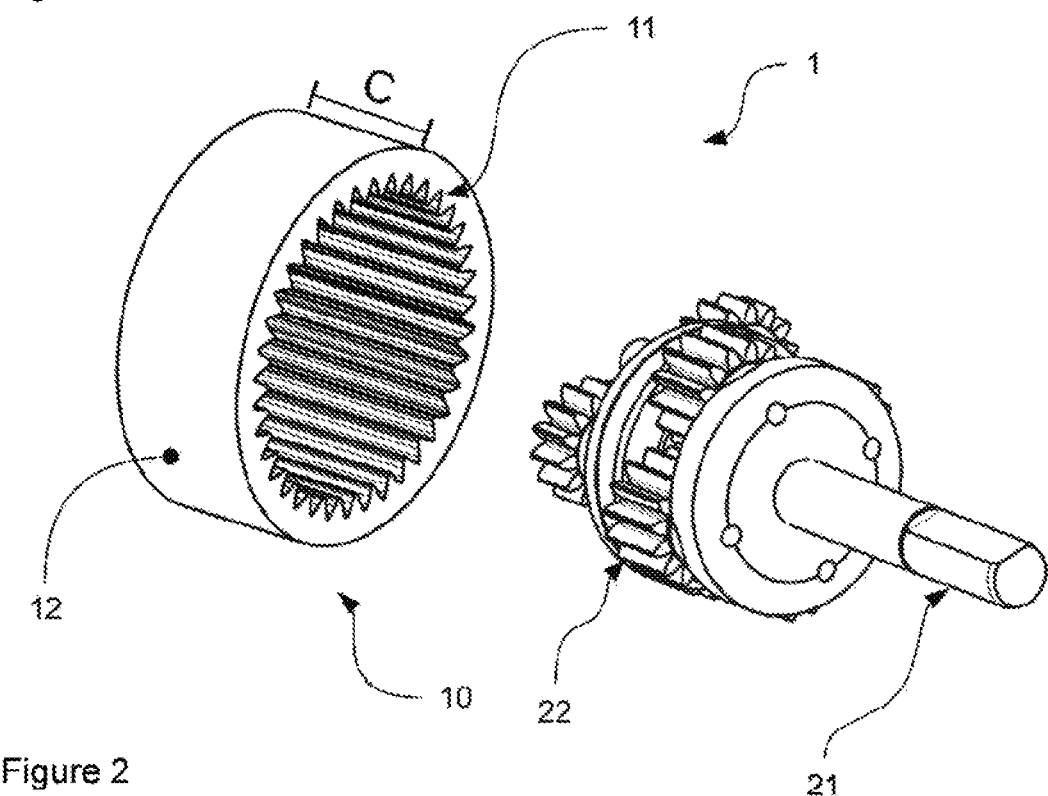
FIG. 1 is an exploded schematic view of a planetary gear train.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 schematically shows a planetary gear train 1 which is formed from a ring gear 10 and planet gears 22 which engage in a sun gear mounted on a shaft 21. The ring gear 10 comprises a ring gear body 12 and is designed with an internal toothing 11 on the inside of the ring gear body 12. The ring gear body 12 is cut to a cutting length C. In the assembled state, the planetary gear train 1 can be operated in different configurations. In one exemplary embodiment, the ring gear 10 is fixed, i.e., it does not rotate during operation. The output is then received by the planet gears 22 rotating about a sun gear. The shaft 21 connected to the sun gear serves as a drive.

In another exemplary embodiment, the ring gear 10 is designed to be rotating. In this instance, the output can be taken from the ring gear 10 and the shaft 21 serves as a drive. Of course, in further exemplary embodiments a reversed configuration is conceivable, in which the ring gear 10 acts as a drive and the output is taken from the shaft 21.

Figure 2:
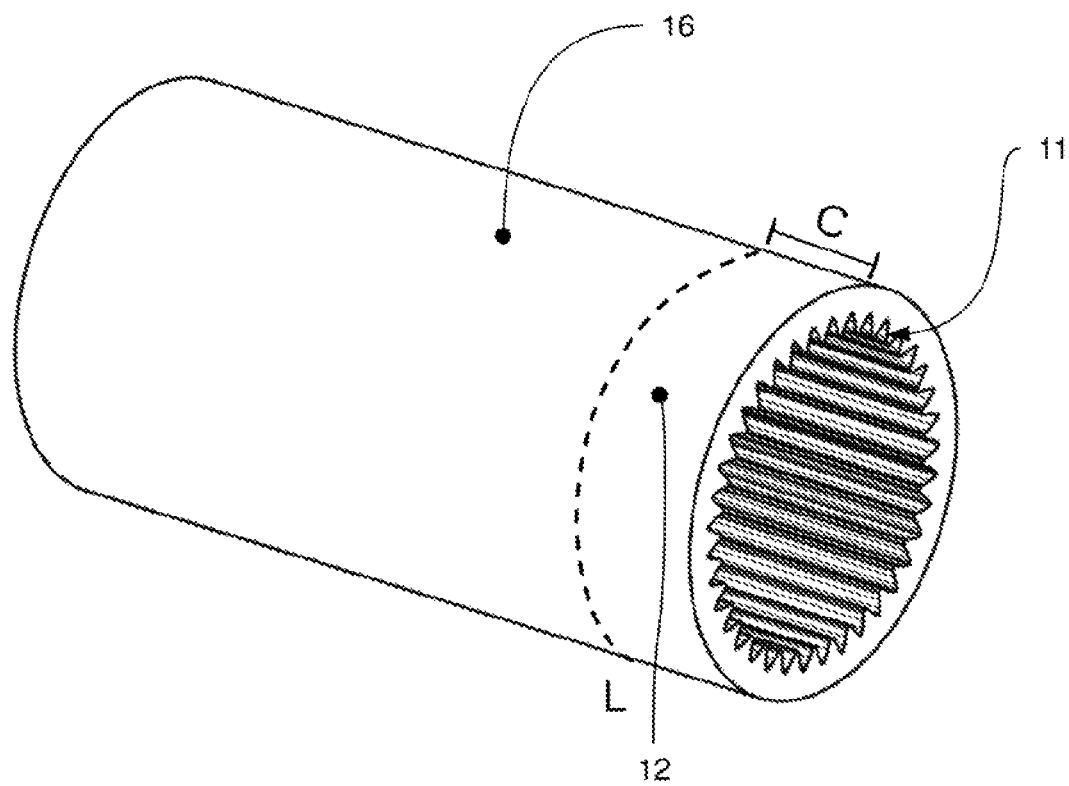
FIG. 2 is a schematic view of a continuous profile.

FIG. 2 shows the ring gear 10 of FIG. 1 before it was cut from a continuous profile 16. In the illustrated exemplary embodiment, the continuous profile 16 is produced by an extrusion process and can have any length. In order to produce a ring gear 10 from the continuous profile 16, the continuous profile 16 is cut off along a cutting line L in such a way that a ring gear body 12 with a cutting length C is formed. In the illustrated exemplary embodiment, the continuous profile 16 is cut using laser cutting.

The internal toothing 11 has already been formed during the extrusion process by the shape of the die used. After cutting off the ring gear body 12 from the continuous profile 16 along the cutting line L, a functional ring gear 10 is thus immediately present.

Figure 3:
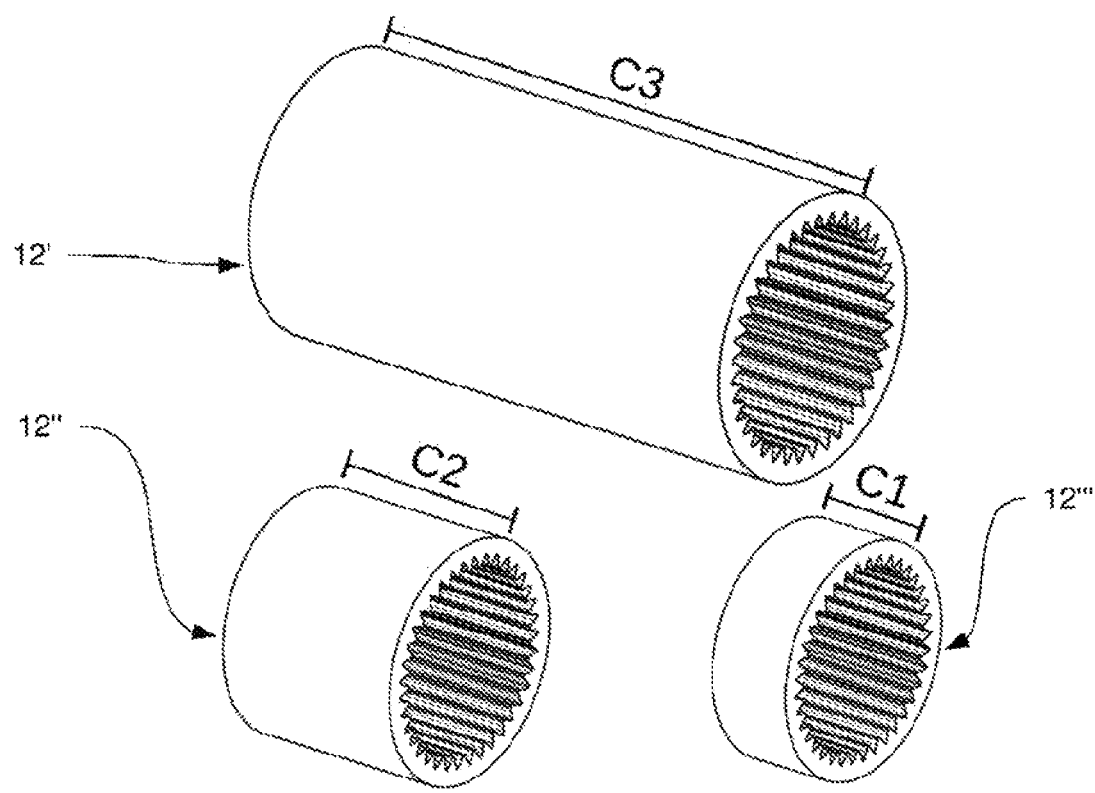
FIG. 3 is a schematic view of several different ring gear bodies.

FIG. 3 shows three ring gear bodies 12', 12'', 12''' which are cut from the same continuous profile 16 with different cutting lengths C1, C2, C3. In the illustrated exemplary embodiment, a thermoplastic, namely reinforced PBT, is used as material for the ring gear bodies 12', 12'', 12'''. The various ring gear bodies 12', 12'', 12''' are combined to form planetary gear trains with different stages.

Figure 4:
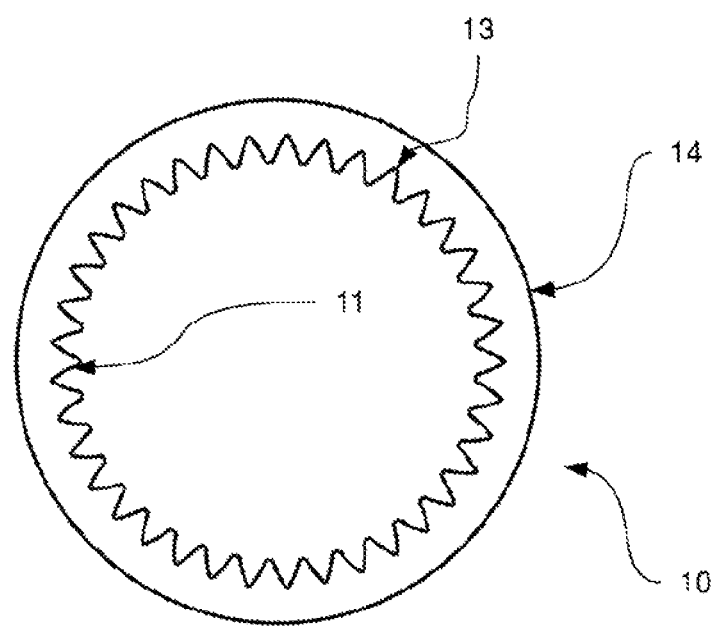
FIG. 4 is a plan view of a ring gear.

FIG. 4 shows a ring gear 10 in a plan view. FIG. 4 clearly shows that internal teeth 11 which can engage in the teeth of a planet gear are provided on the inside 13 of the ring gear 10. In the exemplary embodiment shown, the ring gear 10 is designed as a rotating ring gear 10 so that the achieved gear ratio of the planetary gear train 1 can be taken from the ring gear 10.

Figure 5:
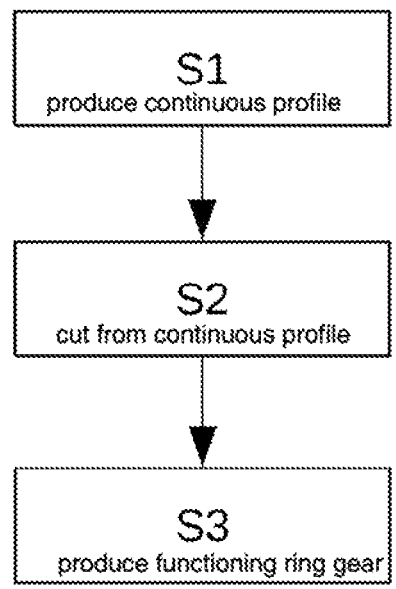
FIG. 5 is a flowchart for producing a ring gear 10.

FIG. 5 shows a flowchart for a method for producing a ring gear 10. In step S1, a continuous profile is produced by an extrusion process. In the exemplary embodiment shown, a plastic is thereby used. In step S1, a plastic granulate can in particular be guided onto a screw and heated. In the molten state, the plastic granulates used are viscous. The screw conveys the granulate in the direction of the die and is therein pressurized. Under pressure, the molten plastic granulate is pressed through the die and thus forms the continuous profile 16. Cut from In step 2, a ring gear body 12 with a cutting length C, C1, C2, C3 is cut from the continuous profile 16. In the illustrated exemplary embodiment, a laser cutting method is used for cutting. In other exemplary embodiments, however, it is also possible to use water jet cutting or electric discharge wire cutting. After completion of step S3, a fully functional ring gear 10 is present.

Figure 6:
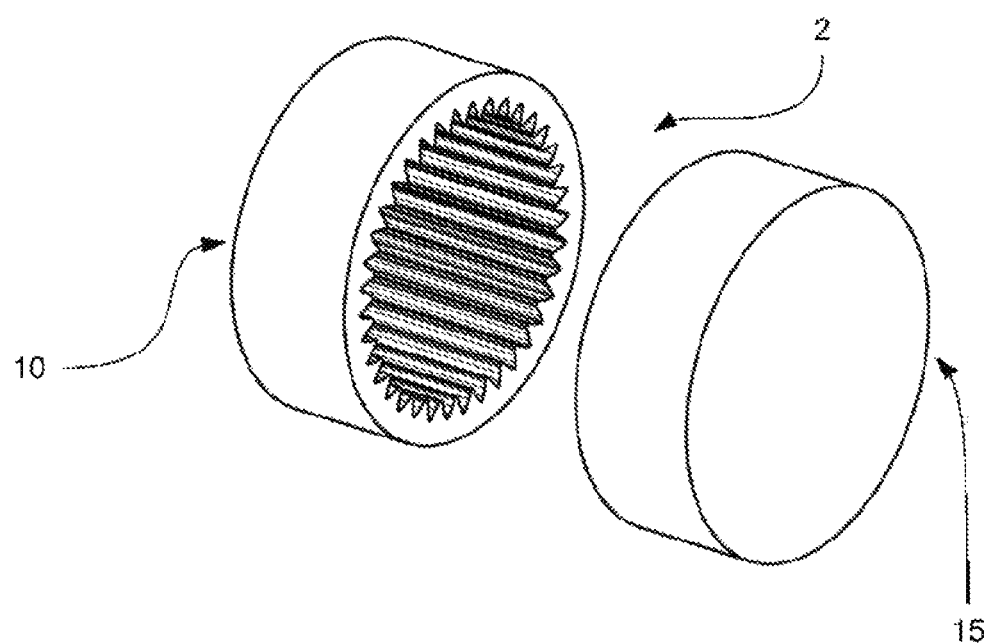
FIG. 6 is an exploded schematic view of a ring gear body with an end plate.

FIG. 6 shows a ring gear 10 with an end plate 15, which together form a housing 2. The end plate 15 is connected to the ring gear 10 by a joining method. In the illustrated exemplary embodiment, the end plate 15 is bonded to the ring gear 10. The end plate 15 forms a customer-specific interface and is therefore only connected to the ring gear 10 after the production of said ring gear 10.

The person skilled in the art concedes that the above-described exemplary embodiments and embodiments merely have exemplary character, and that the individual aspects of the exemplary embodiments may be combined with one another without departing from the inventive concept.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 Planetary gear train
2 Housing
10 Ring gear
11 Internal toothing
12, 12', 12", 12''' Ring gear body
13 Inside
14 Outside
15 End plate
16 Continuous profile
21 Shaft on the sun gear
22 Planet gear
C, C1, C2, C3 Cutting length
L Cutting line
S1, S2, S3 Step

What is claimed is:

1. A method for producing a ring gear for a planetary gear train, the ring gear having a ring gear body with internal toothing on the inside of the ring gear body, the method comprising the steps of:
    producing a continuous profile of the ring gear by an extrusion process involving extruding plastic, wherein the internal toothing is formed on the inside of the plastic ring gear body;
    rotating the continuous profile; and
    subsequently cutting the continuous profile of the plastic ring gear body without burrs by laser cutting on the rotating continuous profile to a predetermined cutting length in order to form the plastic ring gear body.

2. The method according to claim 1, wherein the continuous profile is cut several times at different cutting lengths.

3. The method according to claim 1, further comprising the steps of:
    providing an end plate and mounting the end plate on the ring gear body.

4. The method according to claim 3, wherein the end plate is joined to the ring gear body.

5. The method according to claim 3, further comprising the steps of producing the end plate from a plastic.

6. A modular system with planet gears and different ring gears which can be combined to form planetary gear trains with different stages, wherein the ring gears are each produced by a method according to claim 1.

* * * * *